United States Patent
Kim et al.

(10) Patent No.: US 10,809,663 B2
(45) Date of Patent: Oct. 20, 2020

(54) METHOD AND APPARATUS FOR PROCESSING IMAGE

(71) Applicants: SAMSUNG ELECTRONICS CO., LTD., Suwon-si (KR); University of Seoul Industry Cooperation Foundation, Seoul (KR)

(72) Inventors: Hojung Kim, Suwon-si (KR); Kichul Kim, Seoul (KR); Yongkyu Kim, Hwaseong-si (KR); Hongseok Lee, Seoul (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 101 days.

(21) Appl. No.: 15/954,144

(22) Filed: Apr. 16, 2018

(65) Prior Publication Data

US 2019/0155217 A1   May 23, 2019

(30) Foreign Application Priority Data

Nov. 22, 2017 (KR) .................. 10-2017-0156607

(51) Int. Cl.
  *G03H 1/08* (2006.01)
  *G03H 1/04* (2006.01)
  (Continued)

(52) U.S. Cl.
  CPC ......... *G03H 1/0891* (2013.01); *G03H 1/0443* (2013.01); *G03H 1/0808* (2013.01);
  (Continued)

(58) Field of Classification Search
  CPC ...... G03H 1/0808; G03H 1/20; G03H 1/2294; G03H 2001/0825; G03H 2001/205;
  (Continued)

(56) References Cited

U.S. PATENT DOCUMENTS

| | | | | |
|---|---|---|---|---|
| 3,614,189 A | * | 10/1971 | Stewart | G03H 1/26 359/25 |
| 3,698,010 A | * | 10/1972 | Lee | G03H 1/26 365/122 |
| 4,120,569 A | * | 10/1978 | Richards, Jr. | G03H 1/26 359/11 |
| 5,028,102 A | * | 7/1991 | Ogura | G03H 1/08 359/107 |

(Continued)

FOREIGN PATENT DOCUMENTS

| | | |
|---|---|---|
| JP | 5352763 B2 | 11/2013 |
| KR | 10-2013-0086437 A | 8/2013 |
| KR | 10-2016-0104363 A | 9/2016 |

OTHER PUBLICATIONS

Choe, et al., "Fast hologram generation of three-dimensional objects using line-redundancy and novel-look-up table method", ICTC, 2010, 2 pages total.

(Continued)

*Primary Examiner* — Aklilu K Woldemariam
(74) *Attorney, Agent, or Firm* — Sughrue Mion, PLLC

(57) ABSTRACT

An image processing system for processing image data includes an image processing apparatus configured to process the image data to generate a hologram image; and a first memory and a second memory that store the image data. The image processing apparatus performs a first process and a second process in parallel, wherein the first process includes reading first data from the first memory and writing the first data to the second memory, and the second process includes reading second data from the second memory and writing the second data to the first memory.

15 Claims, 15 Drawing Sheets

(51) Int. Cl.
*G06T 1/60* (2006.01)
*G06T 1/20* (2006.01)

(52) U.S. Cl.
CPC .................. *G06T 1/20* (2013.01); *G06T 1/60* (2013.01); *G03H 2226/02* (2013.01)

(58) Field of Classification Search
CPC ......... G03H 2210/30; G03H 2210/452; G03H 2223/23; G03H 2226/02; G03H 2240/61; G03H 1/26; G03H 1/0005; G03H 1/0443; G03H 1/2249; G03H 2001/2271; G03H 2210/42; G03H 2210/44; G03H 2226/13; G03H 1/0476; G03H 2001/2675; G03H 2240/62; G03H 1/0891; G06T 2207/10004; G06T 2207/20048; G06T 5/10; G06T 19/20; G06T 1/60; G06T 2207/20056; G06T 15/10; G06T 7/593; G11C 13/04; G11C 13/046; G11C 11/1675; G06F 3/005; G06F 3/011; G02B 27/017; H04N 7/183; H04N 13/161; H04N 13/194; H04N 13/117; H04N 13/167; H04N 13/189; H04N 13/261; H04N 13/324; H04N 13/337; H04N 13/344; H04N 13/363; H04N 13/398; H04N 5/74; H04N 13/243; H04N 21/47202; H04N 2213/001; H04N 5/2251; H04N 5/2252; H04N 5/2253; H04N 5/23238; H04N 5/247; H04N 5/3415; G01N 15/1463; G01N 15/1475; G03B 17/561; G03B 35/08; G03B 37/04
USPC ....... 345/8, 156; 356/9, 11, 25, 35, 276, 900
See application file for complete search history.

(56) References Cited

U.S. PATENT DOCUMENTS

| | | | | |
|---|---|---|---|---|
| 5,285,438 | A | * | 2/1994 | Marchand ............... G03H 1/26 359/29 |
| 5,347,375 | A | * | 9/1994 | Saito .................... H03H 1/0476 359/35 |
| 5,668,648 | A | * | 9/1997 | Saito .................... G03H 1/0841 359/9 |
| 5,959,663 | A | * | 9/1999 | Oba ....................... G06T 15/10 348/46 |
| 8,416,669 | B2 | | 4/2013 | Sato |
| 8,681,166 | B1 | * | 3/2014 | Chalil .................. G06F 9/5016 345/543 |
| 9,081,363 | B2 | | 7/2015 | Nam et al. |
| 2005/0041746 | A1 | * | 2/2005 | Rosen .................. H04B 1/7163 375/242 |
| 2013/0242301 | A1 | * | 9/2013 | Berg .................. G01N 15/1475 356/336 |
| 2016/0029008 | A1 | * | 1/2016 | Prechtl .................... G06T 7/593 348/48 |
| 2016/0255338 | A1 | | 9/2016 | Song et al. |
| 2016/0266542 | A1 | * | 9/2016 | Yamaichi ............. G03H 1/0443 |
| 2017/0064333 | A1 | * | 3/2017 | Kim ...................... H04N 19/60 |
| 2017/0091916 | A1 | | 3/2017 | Kim et al. |
| 2017/0103503 | A1 | * | 4/2017 | Kim ................... G11C 11/1657 |
| 2018/0150027 | A1 | | 5/2018 | Kim et al. |

OTHER PUBLICATIONS

Dong, et al., "MPEG-based novel look-up table for rapid generation of video holograms of fast-moving three-dimensional objects", Optics Express, Mar. 2014, vol. 22, Issue No. 7, pp. 8047-8067.

* cited by examiner

METHOD AND APPARATUS FOR PROCESSING IMAGE

CROSS-REFERENCE TO RELATED APPLICATION

This application claims priority from Korean Patent Application No. 10-2017-0156607, filed on Nov. 22, 2017, in the Korean Intellectual Property Office, the disclosure of which is incorporated herein by reference in its entirety.

BACKGROUND

1. Field

Apparatuses and methods consistent with exemplary embodiments relate to processing an image.

2. Description of the Related Art

In the field of three-dimensional (3D) image technology, research has been actively conducted to develop apparatuses for realizing a high-definition hologram in real time by using a complex spatial light modulator (SLM) capable of simultaneously controlling the amplitude and phase of light.

To reproduce a hologram moving picture, a computer-generated hologram (CGH) has been used. Image processing apparatuses perform a very large number of computations to compute a hologram value for each location in a hologram plane. In other words, to express a point in space, image processing apparatuses need to perform a Fourier transform operation once. To express an image of a space, image processing apparatuses need to perform as many Fourier transform operations as the number of corresponding pixels of the image.

Image processing apparatuses, such as televisions (TVs) and mobile devices, may process image data to reproduce a hologram image. In this case, the image processing apparatuses may perform a Fourier transform on the image data and reproduce an image by using the transformed data.

When the image processing apparatuses perform Fourier transform, a large number of computations are performed, which is time-consuming. In particular, portable devices such as mobile devices are limited in size and available power. Thus, there is a demand for methods of reducing the number of computations and the computation time when image processing apparatuses perform Fourier transform.

SUMMARY

One or more exemplary embodiments provide methods and apparatuses for processing image data.

Further, one or more exemplary embodiments provide a non-transitory computer-readable recording medium having embodied thereon a computer program for executing a method for processing image data.

According to an aspect of an exemplary embodiment, there is provided an image processing system for processing image data, the image processing system including: an image processing apparatus configured to process the image data to generate a hologram image; and a first memory and a second memory that store the image data and data processed by the image processing apparatus, wherein the image processing apparatus performs a first process and a second process in parallel, the first process including reading first data from the first memory and writing the first data to the second memory, and the second process including reading second data from the second memory and writing the second data to the first memory.

According to an aspect of another exemplary embodiment, an method of processing image data includes processing image data input from an external apparatus to generate a hologram image; and storing the image data and processed data, wherein the processing includes: performing a first process and a second process in parallel, the first process including reading first data from a first memory and writing the first data to a second memory, and the second process including reading second data from the second memory and writing the second data to the first memory.

According to an aspect of another embodiment, there is provided a non-transitory computer readable storage medium storing a program that is executable by a computer to perform the method of processing the image data.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
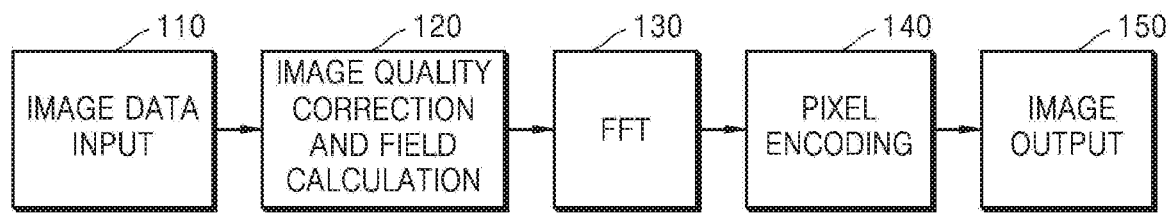
FIG. 1 is a schematic view illustrating a process of processing image data, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The terms used in the embodiments are those general terms currently widely used in the art in consideration of functions in regard to the embodiments, but the terms may vary according to the intentions of those of ordinary skill in the art, precedents, or new technology in the art. Also, in some cases, there may be terms that are optionally selected by the applicant, and the meanings thereof will be described in detail in the corresponding portions of the description of the embodiments. Thus, the terms used herein should be understood not as simple names but based on the meaning of the terms and the overall description of the embodiments.

Throughout the specification, when something is referred to as "including" a component, another component may be further included unless specified otherwise. Also, as used herein, the terms "units" and "modules" may refer to units that perform at least one function or operation, and the units may be implemented as hardware or software or a combination of hardware and software.

Hereinafter, exemplary embodiments will be described in detail with reference to the accompanying drawings so that those of ordinary skill in the art may easily implement the exemplary embodiments. In this regard, the exemplary embodiments may have different forms and should not be construed as being limited to the descriptions set forth herein.

FIG. 1 is a schematic view illustrating a process of processing image data, according to an exemplary embodiment. Referring to FIG. 1, an image processing apparatus may receive image data and output an image on which image processing has been performed.

In operation 110, the image processing apparatus receives image data. For example, in computer-generated holography (CGH), when a layer-based algorithm is applied to image data, the image data may be color data (or a color image), depth data (or a depth image), or the like. The color data may be data representing a plurality of colors for each plane. For example, the color data may be a red image, a blue image, and a green image. The layer-based algorithm is used to process data of each of a plurality of planes into which a reproduction area of a hologram is split based on depths. The image processing apparatus may generate a hologram image by performing a Fourier transform or an inverse Fourier transform on the data of each of the planes.

In operation 120, the image processing apparatus performs image quality correction and field computation. The image processing apparatus may correct the image data to improve image quality of the image data.

In operation 130, the image processing apparatus performs a Fourier transform or a fast Fourier transform (FFT). For example, the image processing apparatus may perform a FFT on a two-dimensional (2D) matrix type of image data. The image processing apparatus may perform a one-dimensional (1D) FFT twice to accomplish a 2D FFT. The image processing apparatus may perform a 1D FFT on the image data row-wise and perform a 1D FFT on a result of the 1D Fourier transform column-wise. The image processing apparatus generates a hologram image via the FFT.

The image processing apparatus may include a plurality of cores. The plurality of cores may perform a FFT on the image data in parallel. For example, the image processing apparatus may assign the image data of each plane to the plurality of cores, and the plurality of cores may perform a FFT on the assigned image data.

In operation 130, the image processing apparatus performs a FFT on the image data as described below in detail with reference to FIGS. 2 and 3.

In operation 140, the image processing apparatus performs pixel encoding. The image processing apparatus generates data that is to be input to a screen, via the pixel encoding.

In operation 150, the image processing apparatus outputs an image to an image display.

Figure 2:
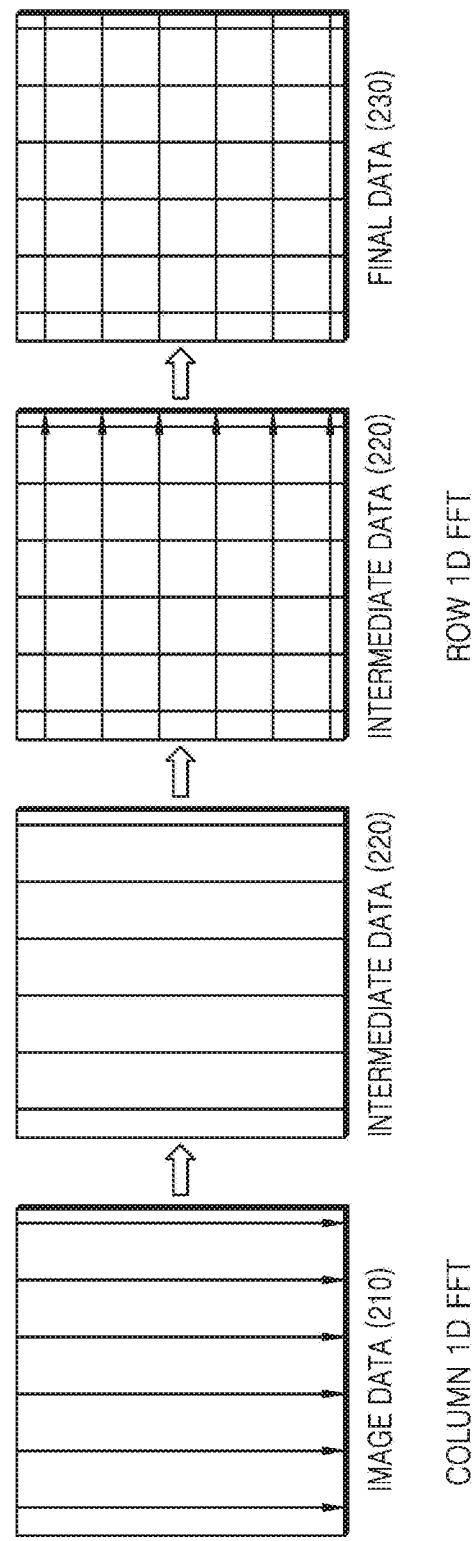
FIG. 2 illustrates an example of a process of transforming data.

FIG. 2 illustrates an example of a process of transforming data.

Referring to FIG. 2, the image processing apparatus or a Fourier transform apparatus generates final data 230 by performing a 1D FFT twice on image data 210 (primary 2D FFT). For example, the image processing apparatus performs a 1D FFT once on the image data 210 in the column direction to generate intermediate data 220 and then performs a 1D FFT once on the intermediate data 220 row-wise to generate the final data 230. A secondary 2D FFT may also be achieved by performing a 1D FFT twice. The primary 2D FFT is an FFT from the pupil of a user to the retina of the user, and the secondary 2D FFT may be an FFT from a panel to the pupil.

The order of execution, in terms of column-wise and row-wise, of 1D FFTs for the primary 2D FFT may be opposite to that of execution of 1D FFTs for the secondary 2D FFT. For example, when 1D FFTs are performed column-wise and then row-wise when a primary 2D FFT is performed, 1D FFTs may be performed row-wise and then column-wise when a secondary 2D FFT is performed.

In FIG. 2, for example, a case in which the image processing apparatus performs a 1D FFT first column-wise is described. In FIG. 3, for example, a case in which the image processing apparatus performs a 1D FFT first column-wise is described.

Figure 3:
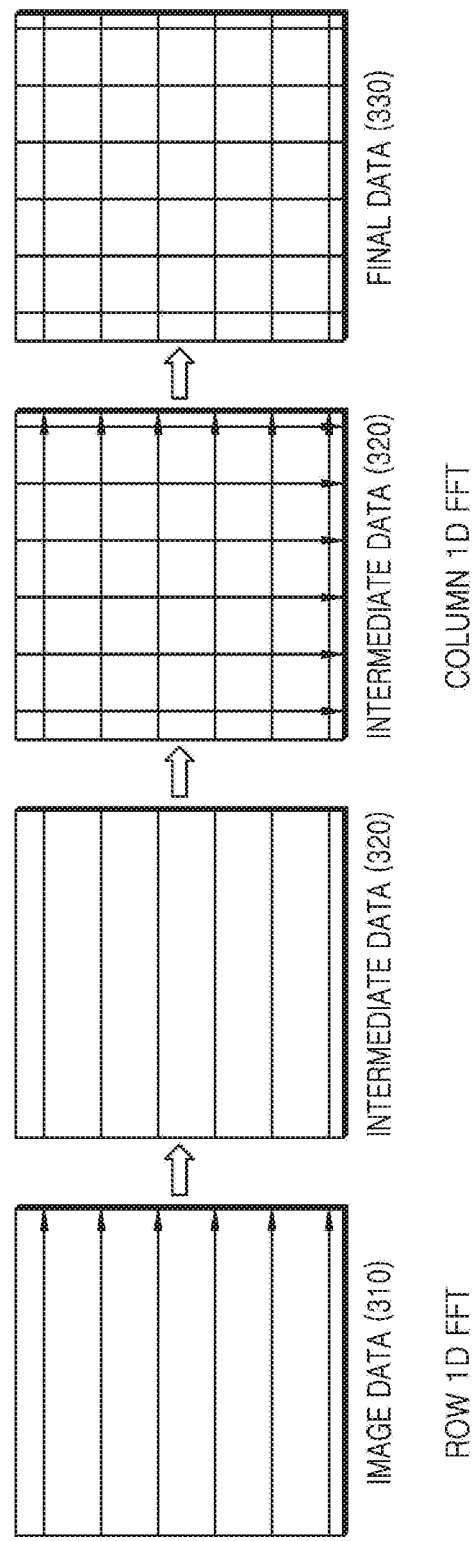
FIG. 3 illustrates another example of a process of transforming data.

Although only a case where a primary 2D FFT is performed is illustrated in FIGS. 2 and 3, a secondary 2D FFT may also be performed in substantially the same manner as the primary 2D FFT or by changing the order of a row and a column.

The image processing apparatus performs a 1D FFT on the image data 210 column-wise. The intermediate data 220 is data obtained by performing a 1D FFT on the image data 210 column-wise. Arrows marked on the image data 210 indicate directions in which the image processing apparatus performs a 1D FFT. Straight lines marked on the intermediate data 220 indicate directions in which the image data 210 is transformed.

The image processing apparatus reads stored intermediate data 220 from a memory and performs a 1D FFT on the read intermediate data 220 row-wise. When reading out the intermediate data 220 from the memory, the image processing apparatus may read out the intermediate data 220 row-wise and output the read-out intermediate data 220 to each 1D FFT processor.

The image processing apparatus generates the final data 230 by performing a 1D FFT on the intermediate data 220 row-wise. The final data 230 is data obtained as the image data 210 is 1D FFT-transformed respectively column-wise and row-wise.

FIG. 3 illustrates another example of a process of transforming data.

Referring to FIG. 3, the image processing apparatus generates final data 330 by performing a 1D FFT twice on image data 310. For example, the image processing apparatus performs a 1D FFT once on the image data 310 row-wise to generate intermediate data 320 and then performs a 1D FFT once on the intermediate data 320 column-wise to generate the final data 330. In FIGS. 2 and 3, the order of a column and a row is switched and the description presented in FIG. 2 may be identically applied to the description of FIG. 3.

Figure 4:
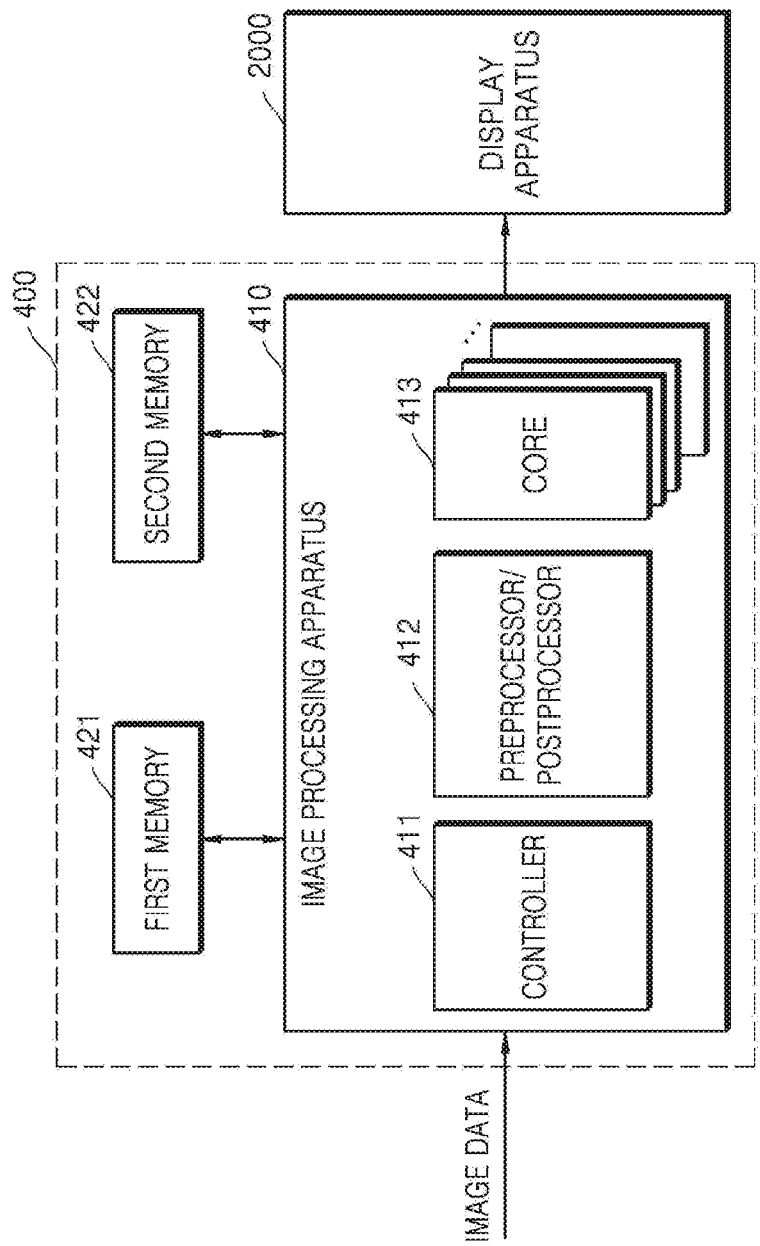
FIG. 4 is a block diagram of an image processing system according to an exemplary embodiment.

FIG. 4 is a block diagram of an image processing system 400 according to an exemplary embodiment. Referring to FIG. 4, the image processing system 400 includes an image processing apparatus 410 and a plurality of memories 421 and 422.

The image processing apparatus 410 processes image data input to the image processing system 400 to generate a hologram image. For example, the image processing apparatus 410 may include a controller 411, a preprocessor/postprocessor 412, and at least one core 413. Also, the image processing apparatus 410 may include the plurality of cores 413. The preprocessor/postprocessor 412 and the at least one core 41 may be also referred to as a pre and post processor 412 and at least one processor core 41, respectively.

For example, each of the controller 411, the preprocessor/postprocessor 412, and the at least one core 413 may include one processor or a plurality of processors. A processor may be implemented as an array of logic gates, or may be implemented as a combination of a general purpose microprocessor and a memory that stores a program may be executed in the microprocessor. Also, it will be understood by one of ordinary skill in the art that the processor may be implemented by other hardware.

The core 413 performs an FFT on data when the image processing apparatus 410 includes the plurality of cores 413, and each of the cores 413 may perform a FFT in parallel. Specifically, each of the cores 413 may in parallel perform a FFT described above with reference to FIGS. 1 to 3.

The controller 411 generally controls an operation of the image processing apparatus 410. In other words, the controller 411 controls operations of the preprocessor/postprocessor 412 and the core 413.

The preprocessor/postprocessor 412 processes data input to the core 413 and data output from the core 413. Here, the data input to the core 413 and the data output from the core 413 include image data, intermediate data, and final data described above with reference to FIGS. 2 and 3. More specifically, the image data input to the image processing system 400 is stored in any one of the plurality of memories 421 and 422. Thereafter, a hologram image is finally generated by the operations of the preprocessor/postprocessor 412 and the core 413 using the image data. In this process, the intermediate data and the final data are generated, and the hologram image is generated based on the final data. The preprocessor/postprocessor 412 performs preprocessing on the data input to the core 413 and post-processing on the data output from the core 413.

For example, the preprocessor/postprocessor 412 may include: i) a memory interface connected to the plurality of memories 421 and 422, ii) a system bus connected to the memory interface, iii) a data preparation unit connected to the system bus and the one core 413, iv) a post processing unit (e.g., a post processor) connected to the data preparation unit, and v) a data filtering unit (e.g., a data filter) connected to the system bus, the post processing unit, and the at least one core 413.

The image processing apparatus 410 according to an exemplary embodiment may be implemented as a single chip on which a plurality of modules for generating the hologram image are integrated. Thus, in comparison with generating of the hologram image through a personal computer (PC) or a graphics card in the related art, the hologram image may be generated more efficiently and the volume of the entire system may be reduced.

The plurality of memories 421 and 422 store the image data input to the image processing system 400 and the data processed by the image processing apparatus 410. Specifically, the plurality of memories 421 and 422 store the image data, the intermediate data, and the final data described above with reference to FIG. 2 and FIG. 3. In FIG. 4, the two independent memories 421 and 422 are included in the image processing system 400, but the number of memories is not limited to two.

The image processing apparatus 410 according to an exemplary embodiment performs a plurality of computations in parallel by using data stored in each of the plurality of memories 421 and 422. For example, the image processing apparatus 410 may perform a first process and a second process in parallel. The first process may include reading data from the first memory 421 and writing data to the second memory 422, and the second process may include reading data from the second memory 422 and writing data to the first memory 421. In this regard, the first process is a process in which the data read from the first memory 421 is processed by the preprocessor/postprocessor 412 and the core 413 and the processed data is written to the second memory 422. The second process is a process in which the data read from the second memory 422 is processed by the preprocessor/postprocessor 412 and the core 413 and the processed data is written to the first memory 421.

In other words, in a process of performing computations, the image processing apparatus 410 performs data input/output to/from the plurality of memories 421 and 422 in parallel. Therefore, the image processing system 400 may generate the hologram image at a higher speed than the conventional one. Specific descriptions of modules included in the image processing system 400 and operations performed by the modules are described below with reference to FIG. 6.

The image processing system 400 may be connected to a display apparatus 2000. Here, the display apparatus 2000 displays the hologram image generated by the image processing system 400.

Hereinafter, an example in which the image processing system 400 operates is described with reference to FIG. 5. An example of the modules included in the image processing system 400 will be described in detail with reference to FIG. 6.

Figure 5:
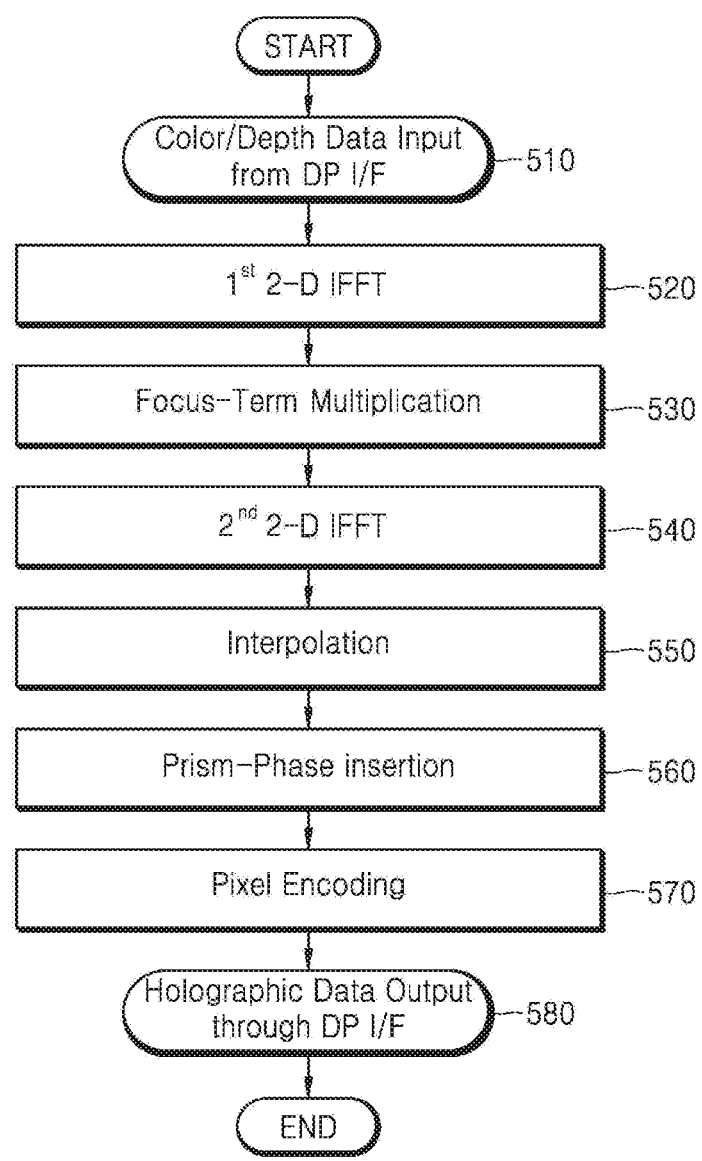
FIG. 5 is a flowchart illustrating an example of a method of processing image data according to an exemplary embodiment.

FIG. 5 is a flowchart illustrating an example of a method of processing image data according to an exemplary embodiment.

The method of processing the image data shown in FIG. 5 includes operations time-serially processed in the image processing system 400 shown in FIG. 4. Accordingly, it is understood that the above description regarding the image processing system 400 shown in FIG. 4 applies to the method of processing the image data of FIG. 5, even though omitted from the following description.

In operation 510, the image processing system 400 receives image data from an external device. Specifically, the image processing system 400 may receive color data and depth data for an image through a display interface (DP I/F).

In operation 520, the image processing system 400 performs a primary 2D IFFT. For example, the at least one core 413 may perform the primary 2D IFFT by performing a primary 1D IFFT row-wise and then the primary 1D IFFT column-wise. Meanwhile, the order in which an IFFT is performed row-wise and the order in which the IFFT is performed column-wise may be switched as described above with reference to FIGS. 2 and 3.

In operation 530, the image processing system 400 performs preprocessing. For example, the preprocessor/postprocessor 412 may perform frequency filtering after multiplying the data on which the primary 2D IFFT is performed by a focus term value affected by coordinates.

In operation 540, the image processing system 400 performs a secondary 2D IFFT. For example, the at least one core 413 may perform the secondary 2D IFFT by performing a secondary 1D IFFT row-wise and then a secondary 1D IFFT column-wise. Meanwhile, the order in which an IFFT is performed row-wise and the order in which the IFFT is performed column-wise may be switched as described above with reference to FIGS. 2 and 3.

In operations 550 to 570, the image processing system 400 performs post-processing. For example, in order to generate a hologram image having an ultra-display (UD) resolution, the preprocessor/postprocessor 412 interpolates the data on which the secondary 2D IFFT is performed and then performs a prism phase Tilt Transmittance computation. Then, the preprocessor/postprocessor 412 may generate data corresponding to the hologram image by performing pixel encoding.

In operation 580, the image processing system 400 transmits the data corresponding to the hologram image to the display apparatus 2000 through the DP I/F. The display apparatus 2000 outputs the hologram image through a display panel.

Figure 6:
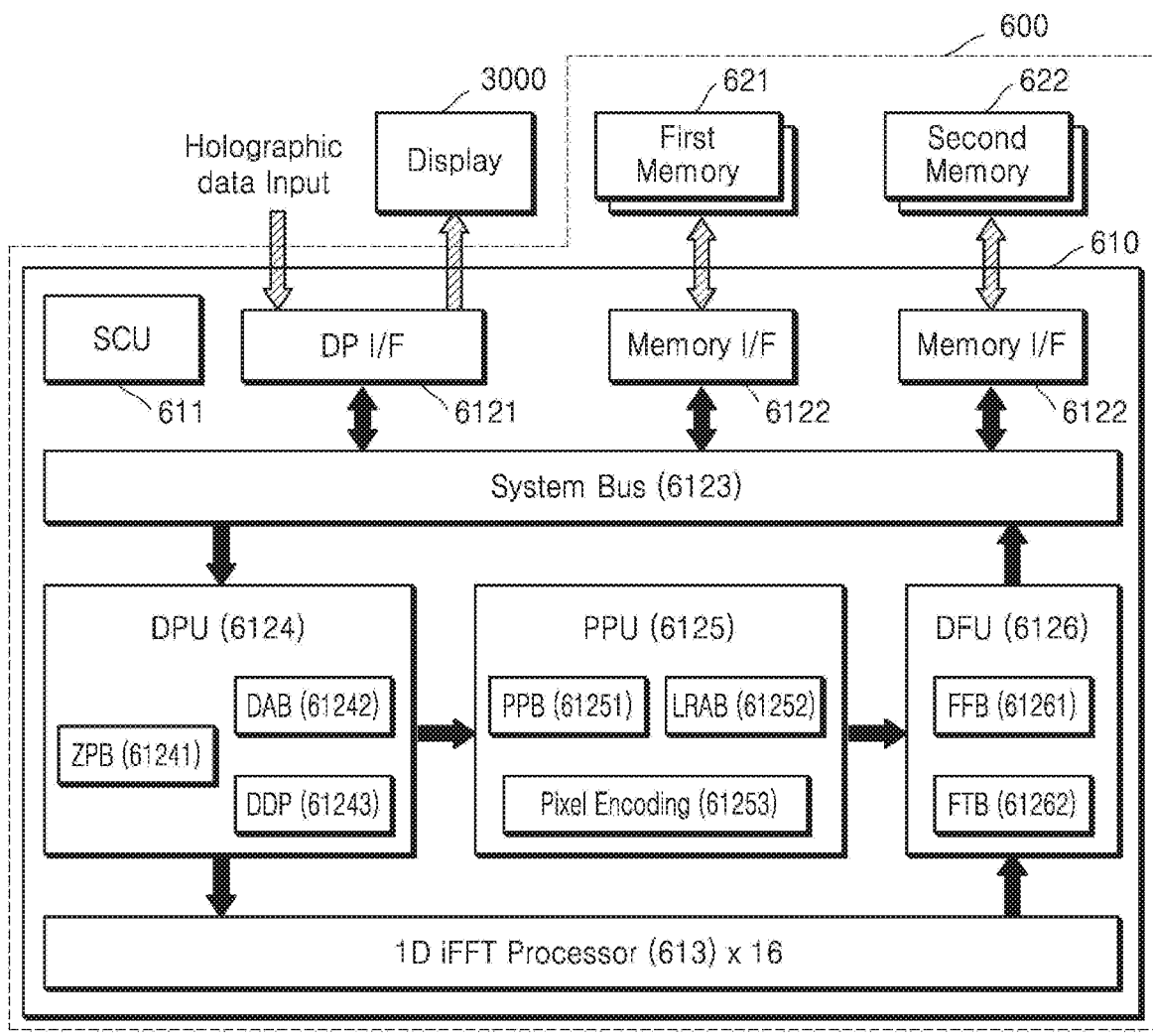
FIG. 6 is a detailed configuration diagram illustrating an example of an image processing system according to an exemplary embodiment.

FIG. 6 is a detailed configuration diagram illustrating an example of an image processing system 600 according to an exemplary embodiment.

Referring to FIG. 6, the image processing system 600 includes an image processing apparatus 610 and a plurality of memories 621 and 622. Although a display apparatus 3000 is not included in the image processing system 600 in FIG. 6, the display apparatus 3000 may be included in the image processing system 600, as described with reference to FIG. 4.

The controller 411 and the at least one core 413 of FIG. 4 may correspond to a system controller unit (SCU) 611 and a 1D IFFT processor 613 of FIG. 6, respectively. The image processing apparatus 610 includes sixteen (16) 1D IFFT processors 613, but the number of processors is not limited thereto.

The preprocessor/postprocessor 412 of FIG. 4 may correspond to configurations of the image processing apparatus 610 of FIG. 6 except for the SCU 611 and the 1D IFFT processor 613. Specifically, the preprocessor/postprocessor 412 includes a DP I/F 6121, a memory interface (I/F) 6122, a system bus 6123, a data preparation unit (DPU) 6124, a post processing unit (PPU) 6125, and a data filtering unit (DFU) 6126.

In FIG. 6, the DPU 6124, the PPU 6125, and the DFU 6126 are classified according to functions performed by the respective units. The functions performed by the DPU 6124, the PPU 6125, and the DFU 6126 are summarized as follows.

The DPU 6124 is a unit that provides data to the 1D IFFT processor 613 and the PPU 6125. For example, the DPU 6124 may perform depth addition, data alignment, depth data provision, zero padding, etc. Specifically, the DPU 6124 includes a zero padding block (ZPB) 61241, a depth addition block (DAB) 61242, and a depth data provider (DDP) 61243.

The ZPB 61241 performs zero-padding on frequency data to which frequency filtering is applied, thereby adjusting the number of data points required for an IFFT computation. After transmitting data on which an IFFT is to be performed last row-wise of each frame and data on which the IFFT is to be performed column-wise to the 1D IFFT processor 613, the ZPB 61241 additionally transfers dummy (zero) data of a 2K/1K-point to the 1D IFFT processor 613 in order to output all result data (both the intermediate data and/or the final data) remaining in the 1D IFFT processor 613.

The DAB 61242 adds each piece of frame data having 8 depths.

The DDP 61243 selects only data having depth information on which a current computation is to be performed from the data read from the memories 621 and 622 and transmits the data to the 1D IFFT processor 613.

The PPU 6125 performs ultra high definition (UHD) extension, prism phase computation, left/right (L/R) addition, and gamma correction on the data on which the primary and secondary 2D IFFT are performed. Specifically, the PPU 6125 includes a prism phase block (PPB) 61251, a left/right image addition and encoding block (LRAB) 61252 and a pixel encoding block 61253.

The PPB 61251 performs a computation of multiplying a specific complex value determined by coordinates of each point data in a UHD frame.

The LRAB 61252 matches data corresponding to a left eye image and data corresponding to a right eye image into one. Then, the LRAB 61252 allocates an 8-bit value from 0 to 255 per point of the matched data.

The pixel encoding block 61253 extends frame data of FHD (2K×1K) resolution to UHD (4K×2K) resolution. Then, the pixel encoding block 61253 transforms final data described above with reference to FIGS. 2 and 3 into 8-bit integer data conforming to a format of the display apparatus 3000.

The DFU 6126 performs frequency filtering, focus term computation, and scaling on the data output from the 1D IFFT processor 613 or the data output from the PPU 6125. Specifically, the DFU 6126 includes a frequency filtering block (FFB) 61261 and a focus term block (FTB) 61262.

The FFB 61261 performs frequency filtering to reduce the number of points of data on which a primary 2D IFFT computation is performed to ¼.

The FTB 61262 corrects a focus of an image by multiplying the data on which the primary 2D IFFT computation is performed by a specific complex value determined by the coordinates of each point data.

The SCU 611 controls overall operations of the image processing system 600. For example, the SCU 611 may exchange control signals with the display apparatus 3000. Also, the SCU 611 provides the image processing system 600 with information about a currently processed frame and controls procedures to be performed in each process.

The 1D IFFT processor 613 performs an FFT on the data. For example, the 1D IFFT processor 613 may perform a 1K-point IFFT and a 2K-point IFFT alternately by using a dual-mode. In other words, when a 2D IFFT computation is to be performed, the 1D IFFT processor 613 performs a row-wise 1D IFFT once and a column-wise 1D IFFT on 2D data once. The hardware utilization may be improved by including the 1D IFFT processor 613 operating in a dual mode in the image processing apparatus 610 according to an embodiment. In other words, since a processor for performing the row-wise 1D IFFT and a processor for performing the column-wise 1D IFFT are not included in the image processing apparatus 610, hardware utilization may be improved.

An example in which the 1D IFFT processor 613 performs the primary 2D IFFT is as follows. First, the 1D IFFT processor 613 performs a row-wise 2K-point 1D IFFT. Thereafter, the 1D IFFT processor 613 performs a column-wise 1K-point 1D IFFT. An example in which the 1D IFFT processor 613 performs the second 2D IFFT is as follows. In contrast to the primary 2D IFFT, first, the 1D IFFT processor 613 performs the column-wise 1K-point 1D IFFT. Thereafter, the 1D IFFT processor 613 performs the row-wise 2K-point 1D IFFT.

At this time, frequency data of a bit-reversal sequence generated when each 1D IFFT computation is performed may be output as a natural sequence through an unscramble and may be stored in any one of the memories 621 and 622.

Also, when the image processing apparatus 610 includes a plurality of 1D IFFT processors 613, each 1D IFFT processor 613 may perform the above-described processes in parallel.

Each of the plurality of memories 621 and 622 stores the image data, the intermediate data, and the final data described above with reference to FIG. 2 and FIG. 3.

The memory I/F 6122 provides a physical/memory controller interface with respect to a memory and writes or reads data to a desired address of each of the plurality of memories 621 and 622 via the system bus 6123.

The system bus 6123 manages data read/write transactions. The system bus 6123 performs functions of arranging and mapping data in accordance with a bus interface so as to transfer data processed by the units included in the image processing apparatus 610. The system bus 6123 exchanges control signals with the SCU 611 and controls the DP I/F 6121 to access the plurality of memories 621 and 622 directly.

The DP I/F 6121 maps the image data to the system bus 6123 and manages a bit per color (BPC), a data lane, a transfer mode, etc. Also, the DP I/F 6121 provides a physical layer with respect to the display apparatus 3000. Also, the DP I/F 6121 manages a video protocol, a maximum bandwidth, a reference clock, and the like. The DP I/F 6121 may also control an operation of the display apparatus 3000 and may also directly access the plurality of memories 621 and 622 connected to the system bus 6123.

The image processing system 600 performs a plurality of computations in parallel by using the data stored in each of the plurality of memories 621 and 622. For example, the image processing system 600 may perform a first process and a second process in parallel. The first process may include reading data from the first memory 621 and writing data to the second memory 622, and the second process may include reading data from the second memory 622 and writing data to the first memory 621. In other words, the image processing system 600 performs a method of processing image data shown in FIG. 5 by performing the first process and the second process in parallel. Hereinafter, an example in which the image processing system 600 processes image data will be described with reference to FIGS. 7A to 7G.

FIGS. 7A to 7G are diagrams for explaining examples in which the image processing system 600 operates according to an exemplary embodiment.

Figure 7A:
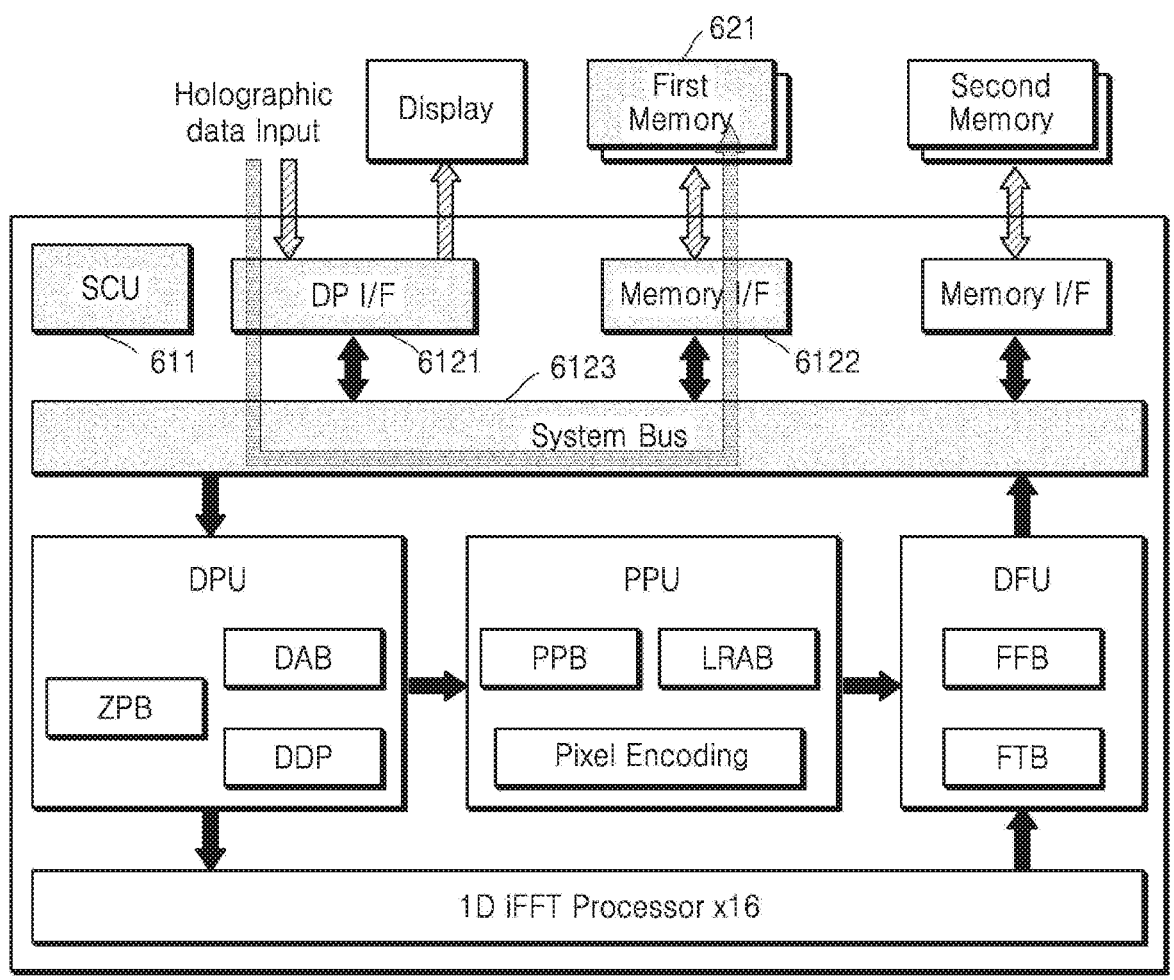
FIGS. 7A, 7B, 7C, 7D, 7E, 7F, and 7G are diagrams for explaining examples in which an image processing system operates according to an exemplary embodiment.

Schematically, FIG. 7A is a diagram showing operation 510 of FIG. 5, and FIGS. 7B to 7F are diagrams showing operations 520 to 570 of FIG. 5. Also, FIG. 7G is a diagram showing operation 580 of FIG. 5. Therefore, it is understood that the above description with reference to FIG. 5 also applies to the example described below with reference to FIG. 7A to FIG. 7G.

Referring to FIG. 6, functions performed by units included in the image processing system 600 have been described. Therefore, a flow of data in the image processing system 600 will be described below, and a detailed description of the functions performed by the units included in the image processing system 600 will be omitted.

Also, a procedure shown in FIGS. 7A to 7G is controlled by the SCU 611 of the image processing system 600.

FIG. 7A, in an initial state (e.g., when power is applied to the image processing system 600 or when the image processing system 600 is reset), the image processing system 600 receives image data from an external apparatus. At this time, the received image data is stored in the first memory 621 through the DP I/F 6121.

Figure 7B:
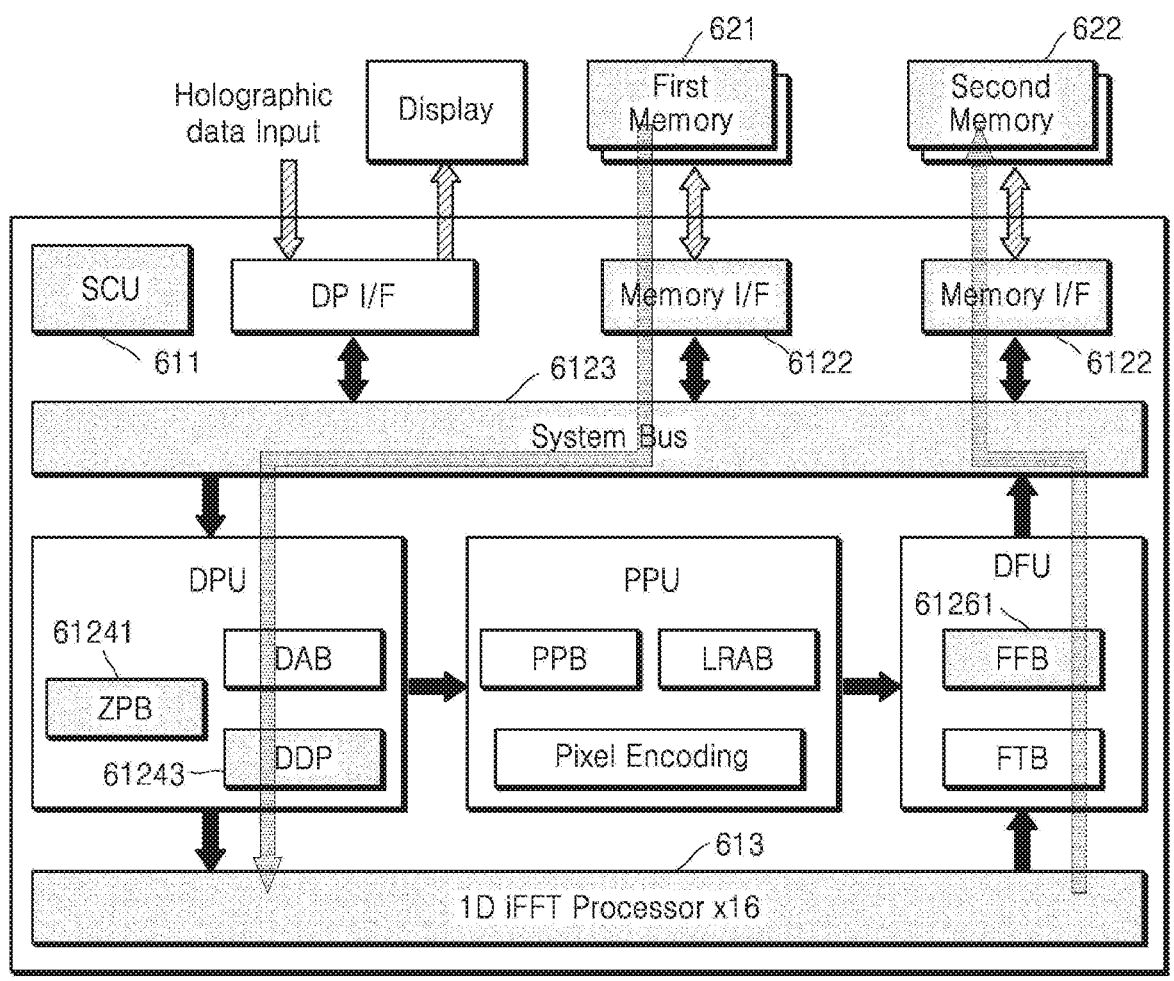

Referring to FIG. 7B, depth data (e.g., 8 bit/point) and frame data (e.g., 8 bit/point) are read out from the first memory 621. Thereafter, the 1D IFFT processor 613 performs a row-wise 2K-point 1D IFFT computation on the read data, and stores a result of the row-wise 2K-point 1D IFFT computation in the second memory 622. At this time, the IFFT computation is performed on frame data (e.g., frame data having a left eye image and a right eye image each having an 8 depth). For a process shown in FIG. 7B, the system bus 6123, the DDP 61243, the ZPB 61241, the 1D IFFT processor 613, and the FFB 61261 operate.

Figure 7C:
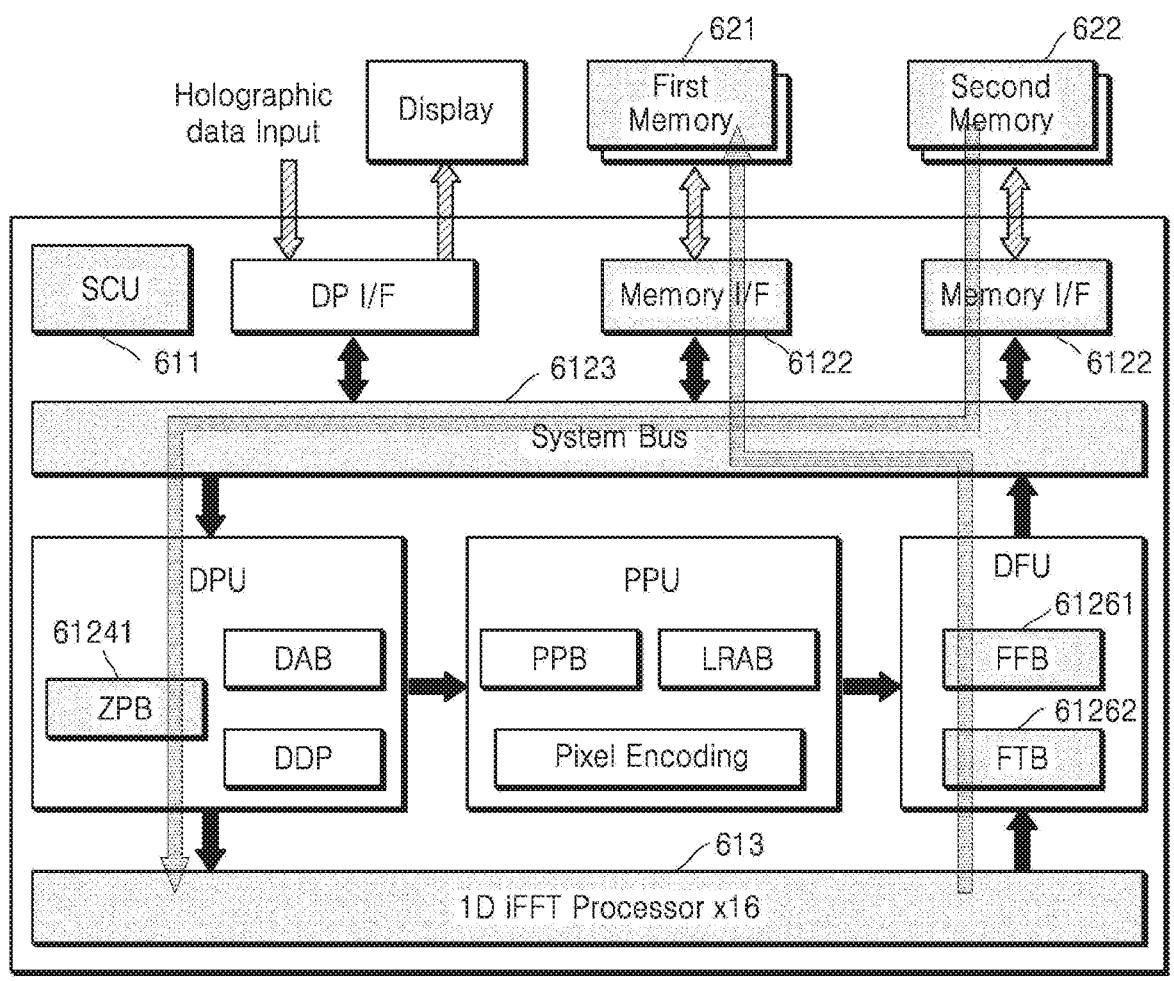

Referring to FIG. 7C, data on which computation has been completed through a procedure shown in FIG. 7B is read out from the second memory 622. The 1D IFFT processor 613 performs a column-wise 1K-point 1D IFFT computation and stores a result of the column-wise 1K-point 1D IFFT computation in the first memory 611. At this time, the IFFT computation is performed on frame data (e.g., frame data having a left eye image and a right eye image each having an 8 depth). For a process shown in FIG. 7C, the system bus 6123, the ZPB 61241, the 1D IFFT processor 613, the FFB 61261, and the FTB 61262 operate.

Through the procedures described with reference to FIGS. 7B to 7C, data on which the primary 2D IFFT computation has been completed is generated. In other words, the row-wise 2K-point 1D IFFT is performed by the procedure shown in FIG. 7B, and the column-wise 1D-point 1D IFFT is performed by the procedure of FIG. 7C.

Figure 7D:
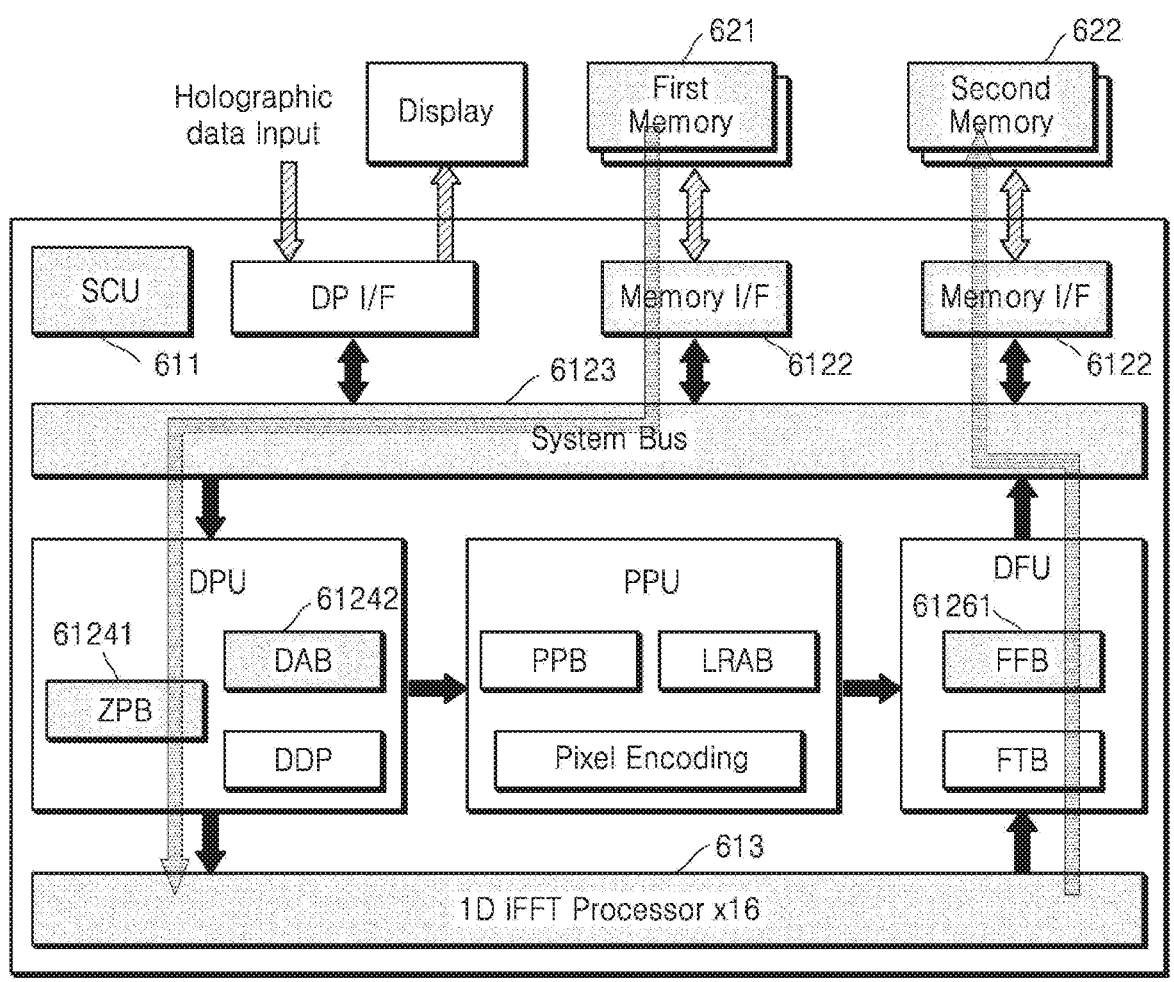

Referring to FIG. 7D, data (e.g., 32 bit/point) in which the primary 2D IFFT computation has been completed is read out from the first memory 621. Then, the data corresponding to the depth is added to each of a left eye image frame and a right eye image frame included in the read data. Thereafter, the ZPB 61241 forms new 1K-point data by padding a part of 1K-point data that was not stored by column-wise frequency filtering to 0. Thereafter, the 1D IFFT processor 613 performs a column-wise 1K-point 1D IFFT computation on the new 1K-point data and stores a result of the column-wise 1K-point 1D IFFT computation in the second memory 622. For a process shown in FIG. 7D, the system bus 6123, the DAB 61242, the ZPB 61241, the 1D IFFT processor 613, and the FFB 61261 operate.

Figure 7E:
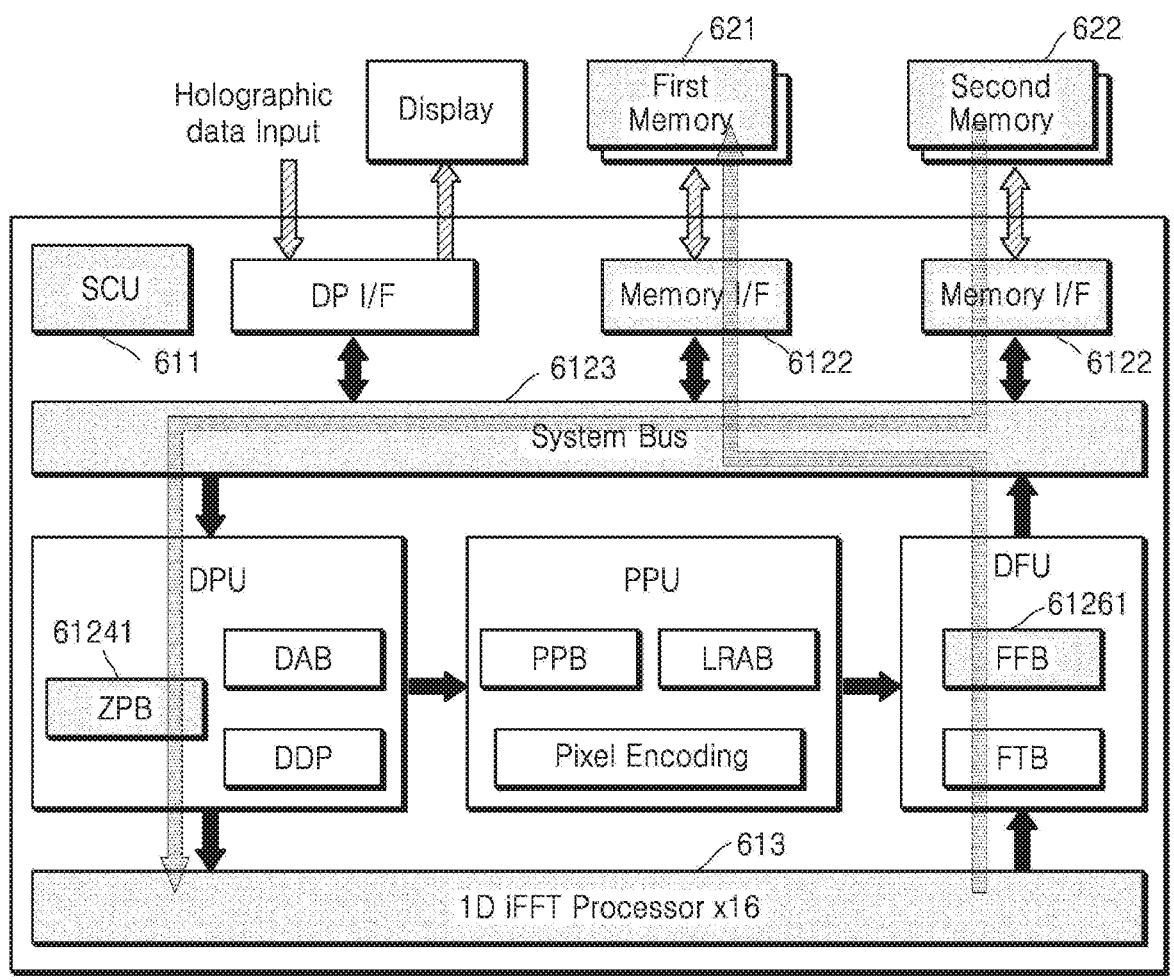

Referring to FIG. 7E, data (e.g., 32 bit/point) on which computation has been completed through the procedure described with reference to FIG. 7D is read out from the second memory 622. Thereafter, the ZPB 61241 forms new 2K-point data by padding a part of 2K-point data that was not stored by row-wise frequency filtering to 0. Thereafter, the 1D IFFT processor 613 performs a row-wise 2K-point 1D IFFT computation on the new 2K-point data and stores a result of the row-wise 2K-point 1D IFFT computation in the first memory 622. For a process shown in FIG. 7E, the system bus 6123, the ZPB 61241, the 1D IFFT processor 613, and the FFB 61261 operate.

Through the procedures described with reference to FIGS. 7D to 7E, data on which the secondary 2D IFFT computation has been completed is generated. In other words, a column-wise 2K-point 1D IFFT is performed by the procedure described with reference to FIG. 7D, and a row-wise 2K-point 1D IFFT is performed by the procedure of FIG. 7E.

Figure 7F:
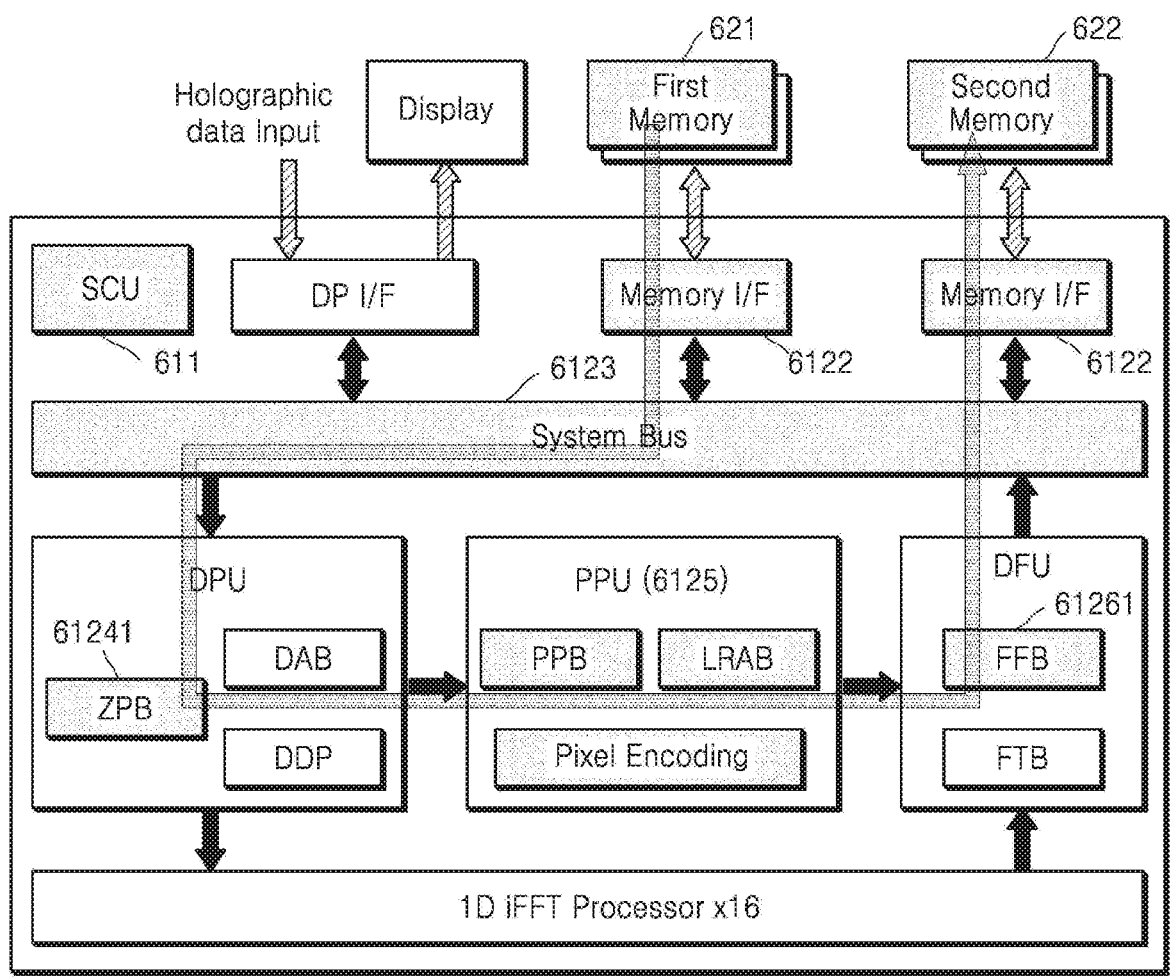
Figure 7G:
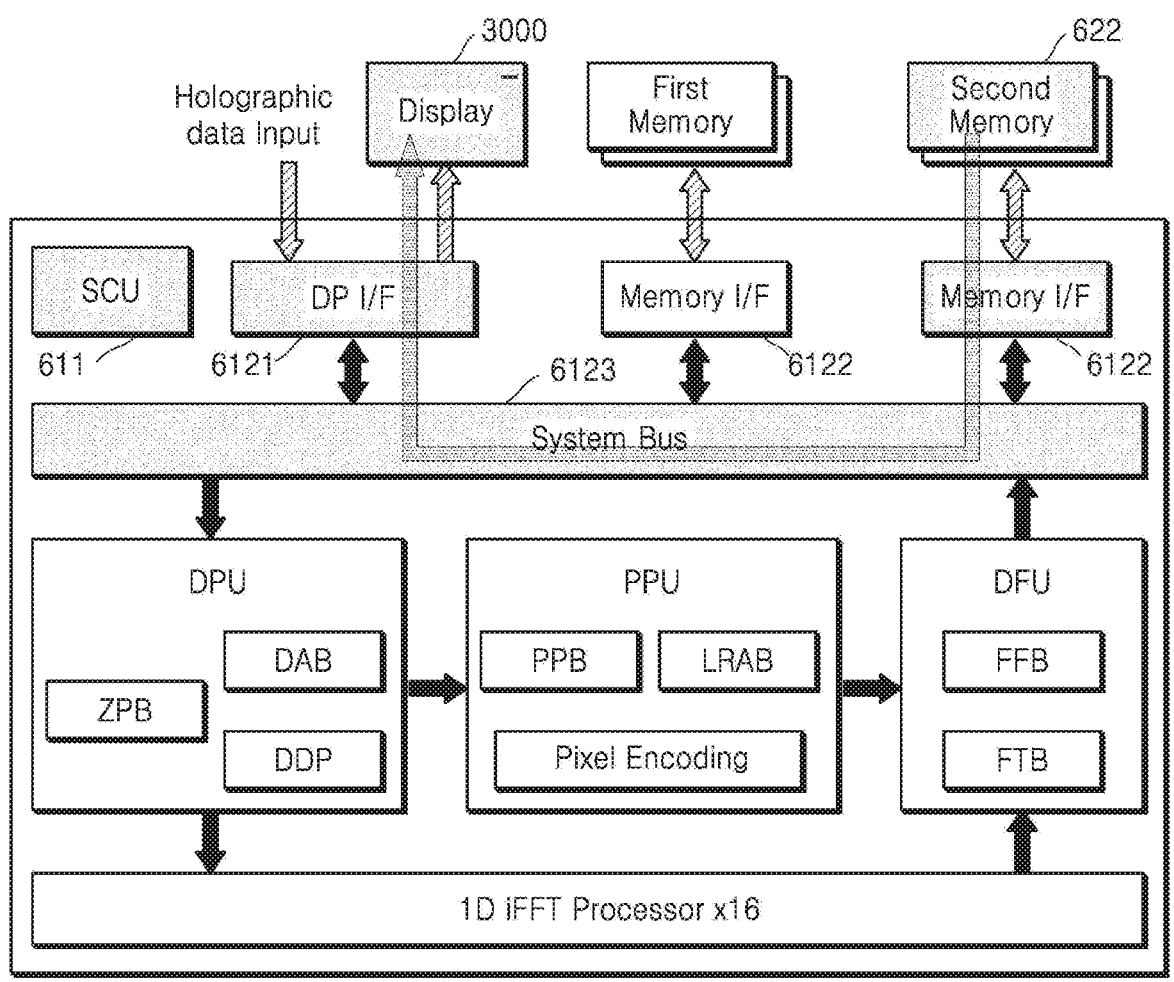

Referring to FIG. 7F, the data (e.g., 32 bit/point) on which the secondary 2D IFFT computation has been completed is read out from the first memory 621. The read data is changed in order and provided to the PPU 6125. The PPU 6125 performs extension on FHD frame data and extend the FHD frame data to UHD. Thereafter, the PPU 6125 performs a prism phase computation on the extended data. Thereafter, data of the left eye image frame and data of the right eye image frame are added to the data on which the prism phase computation has been completed. Thereafter, pixel encoding is performed, and the final data is stored in the second memory 622. For a process shown in FIG. 7F, the system bus 6123, the PPU 6125, and the FFB 61261 operate.

Referring to FIG. 7G, the final data stored in the second memory 622 is read and the read data is output to the display apparatus 3000 through the system bus 6123 and the DP I/F 6121. At the same time, the procedures described with reference to FIGS. 7A to 7G are repeated by switching positions of memory responsible for recording and memory responsible for reading. Here, switching of the positions of memories means that the image data of FIG. 7A is recorded in the second memory 622, and subsequent processes are performed.

Meanwhile, as described above with reference to FIG. 7F, the PPU 6125 performs the prism phase computation on the intermediate data. For example, the PPB 61251 included in the PPU 6125 may perform the prism phase computation by using data stored in a look-up table. Here, the prism phase computation illuminates a hologram image corresponding to the left eye and the right eye in a space free of noise and is performed by the following Equation 1.

$$\text{PrismPhase} = e^{-j(ax+by)} \quad \text{[Equation 1]}$$

In Equation 1, x denotes an x-axis direction distance, and y denotes a y-axis direction distance. Also, a and b are constants and may be preset in the image processing apparatuses 410 and 610. Thus, the prism phase computation may be performed using values that are repeated (e.g., sinusoidal) at a predetermined period.

The PPB 61251 according to an exemplary embodiment uses the data stored in the look-up table when performing the prism phase computation. In particular, since the values used for the prism phase computation are repeated at the predetermined period, only a part of the entire data (values) may be stored in the look-up table.

Hereinafter, an example in which the PPB 61251 operates will be described with reference to FIGS. 8 and 9.

Figure 8:
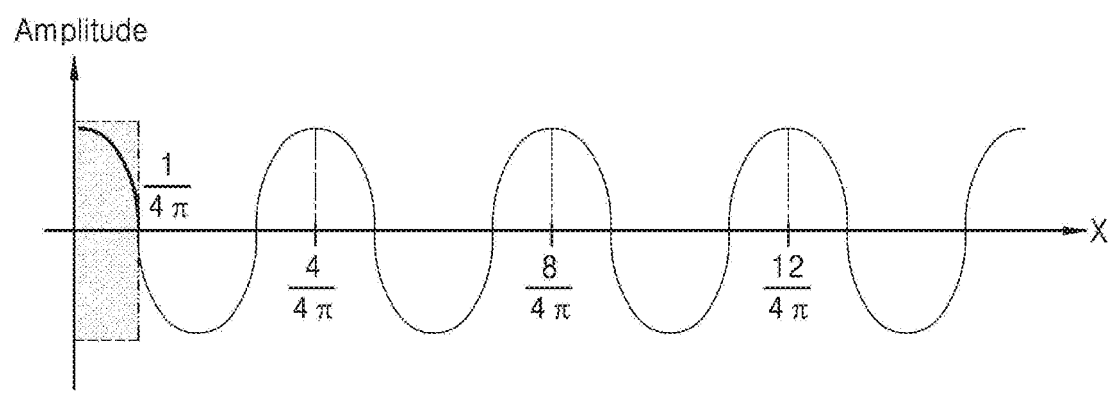
FIG. 8 is a diagram for explaining characteristics of values used in a prism phase computation according to an exemplary embodiment.

FIG. 8 is a diagram for explaining characteristics of values used in a prism phase computation according to an exemplary embodiment.

Referring to FIG. 8, the values used in the prism phase computation are repeated at a predetermined period. For example, the values used in the prism phase computation may be in the form of a sine function or a cosine function.

The PPB 61251 according to an exemplary embodiment reads the values used for the prism phase computation from a look-up table. At this time, only some data (values) among all the data (values) used in the prism phase computation may be stored in the look-up table.

For example, as shown in FIG. 8, the values used in the prism phase computation may be repeated at a period of $4/4\pi$. Therefore, only data corresponding to $1/4\pi$ may be stored in the look-up table according to an exemplary embodiment, and the PPB 61251 may perform an entire prism phase computation by using only the data corresponding to $1/4\pi$.

Specifically, the PPB 61251 may compute values corresponding to $4/4\pi$ by performing left-right symmetry and/or positive-negative change on values corresponding to $1/4\pi$. Thus, the PPB 61251 may perform the entire prism phase computation by using only some (e.g., one fourth) of the data stored in the look-up table. Therefore, since a size of the look-up table may be reduced, the total volume of the image processing apparatuses 400 and 600 may be reduced.

Figure 9:
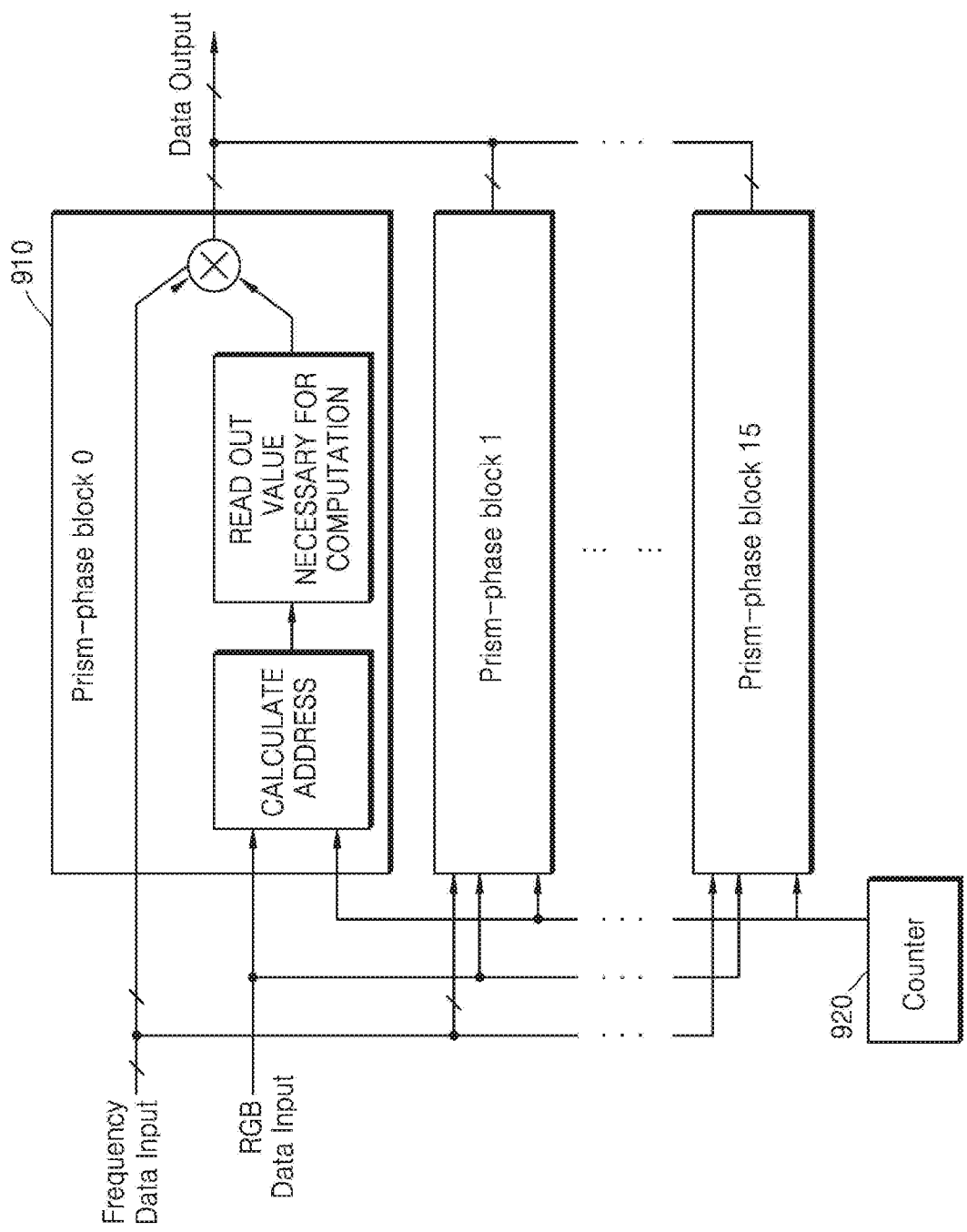
FIG. 9 is a configuration diagram showing an example of a prism phase block (PPB) according to an exemplary embodiment.

FIG. 9 is a configuration diagram showing an example of a PPB 910 according to an exemplary embodiment.

In the PPB 910, frequency data and color data used for a prism phase computation are input. At this time, a counter 920 calculates coordinates (e.g., coordinates in a frame) corresponding to the input frequency data and color data and transmits the coordinates to the PPB 910. The PPB 910 calculates an address according to the input coordinates. Then, the PPB 910 reads a value necessary for computation from a look-up table. Then, the PPB 910 may perform the prism phase operation by multiplying the input data by the read value.

Meanwhile, a plurality of PPBs 910 may be included in the image processing apparatuses 400 and 600. In this case, the plurality of PPBs 910 may perform prism phase computation in parallel.

According to the above description, the image processing systems 400 and 600 perform computations by simultaneously using a plurality of memories, thereby increasing a computation speed. Further, the image processing systems 400 and 600 perform the entire prism phase computation by using some data stored in the look-up table, and thus the total volume of the image processing apparatuses 400 and 600 may be reduced.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing system comprising:
   an image processing apparatus configured to process image data to generate a hologram image; and a first memory and a second memory that store the image data, wherein the image processing apparatus performs a first process and a second process in parallel, the first process including reading first data from the first memory to perform either a row-wise Fast Fourier Transform (FFT) computation or a column-wise one-dimensional (1D) FFT computation and writing the first data to the second memory, and the second process including reading second data from the second memory to perform either a column-wise FFT computation or a row-wise 1D FFT computation and writing the second data to the first memory.

2. The image processing system of claim 1,
wherein the first process comprises:
reading depth data and frame data from the first memory, and storing, in the second memory, a result of the row-wise Fast Fourier Transform (FFT) computation that has been performed on the depth data and the frame data
wherein the second process comprises:
reading the result of the row-wise FFT computation from the second memory, and storing, in the first memory, a result of the column-wise FFT computation that has been performed on the result of the row-wise FFT computation.

3. The image processing system of claim 1,
wherein the first process comprises:
reading a result of a two-dimensional (2D) FFT computation from the first memory, and storing, in the second memory, a result of the column-wise one-dimensional (1D) FFT computation that has been performed using the result of the 2D FFT computation,
wherein the second process comprises:
reading the result of the column-wise 1D FFT computation from the second memory, and storing, in the first memory, a result of the row-wise 1D FFT computation that has been performed using the result of the column-wise 1D FFT computation.

4. The image processing system of claim 1, wherein the image processing apparatus comprises:
at least one core configured to perform at least one of the row-wise FFT computation, column-wise FFT computation, the column-wise 1D FFT computation, and the row-wise 1D FFT computation on data;
a pre and post processor configured to process data input to the at least one core and data output from the at least one core; and
a controller configured to control an operation of the image processing apparatus.

5. The image processing system of claim 4, wherein the pre and post processor comprises:
a memory interface connected to the first memory and the second memory;
a system bus connected to the memory interface;
a data preparation unit connected to the system bus and the at least one core;
a post processor connected to the data preparation unit; and
a data filter connected to the system bus, the post processor, and the at least one core.

6. The image processing system of claim 1, wherein the image processing apparatus is configured to perform a prism phase computation based on ¼ of entire data that is carried by a cosine or sine signal for one period.

7. The image processing system of claim 6, the image processing apparatus is further configured to perform either or both of a left and right symmetry and a positive and negative change on amplitude values of the ¼ of the cosine or sine signal, to obtain the entire data that is carried by the cosine or sine signal for the one period, and perform the prism phase computation on the entire data that is carried by the cosine or sine signal for the one period.

8. The image processing system of claim 1, further comprising: a display configured to display the hologram image.

9. A method of processing image data, the method comprising:
processing image data input from an external apparatus to generate a hologram image; and
storing the image data and processed data,
wherein the processing comprises: performing a first process and a second process in parallel, the first process including reading first data from a first memory to perform either a row-wise Fast Fourier Transform (FFT) computation or a column-wise one-dimensional (1D) FFT computation and writing the first data to a second memory, and the second process including reading second data from the second memory to perform either a column-wise FFT computation or a row-wise 1D FFT computation and writing the second data to the first memory.

10. The method of claim 9,
wherein the first process comprises:
reading depth data and frame data from the first memory, and storing, in the second memory, a result of the row-wise Fast Fourier Transform (FFT) computation that has been performed on the depth data and the frame data
wherein the second process comprises:
reading the result of the row-wise FFT computation from the second memory, and storing, in the first memory, a result of the column-wise FFT computation that has been performed on the result of the row-wise FFT computation.

11. The method of claim 9,
wherein the first process comprises:
reading a result of a two-dimensional (2D) FFT computation from the first memory, and storing, in the second memory, a result of the column-wise one-dimensional (1D) FFT computation that has been performed using the result of the 2D FFT computation, and
wherein the second process comprises:
reading the result of the column-wise 1D FFT computation from the second memory, and storing, in the first memory, a result of the row-wise 1D FFT computation that has been performed using the result of the column-wise 1D FFT computation.

12. The method of claim 9, wherein the processing the image data comprises: performing a prism phase computation by using ¼ of entire data that is carried by a cosine or sine signal for one period.

13. The method of claim 12, wherein the processing the image data further comprises:
performing either or both of a left and right symmetry and a positive and negative change on amplitude values of the ¼ of the cosine or sine signal, to obtain the entire data that is carried by the cosine or sine signal for the one period, and perform the prism phase computation on the entire data that is carried by the cosine or sine signal for the one period.

14. The method of claim 9, further comprising: displaying the hologram image.

15. A non-transitory computer readable storage medium storing a program that is executable by a computer to perform the method of claim 9.

* * * * *